July 19, 1927.  
J. D. GRABILL  
SIZING MACHINE FOR FRUITS AND VEGETABLES  
Filed Sept. 13, 1926  
1,636,227  
2 Sheets-Sheet 1
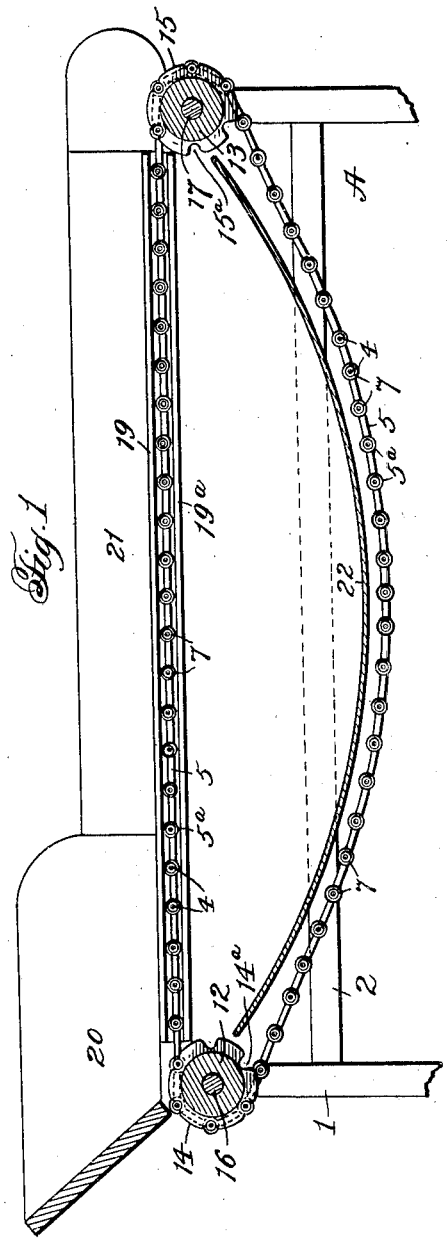
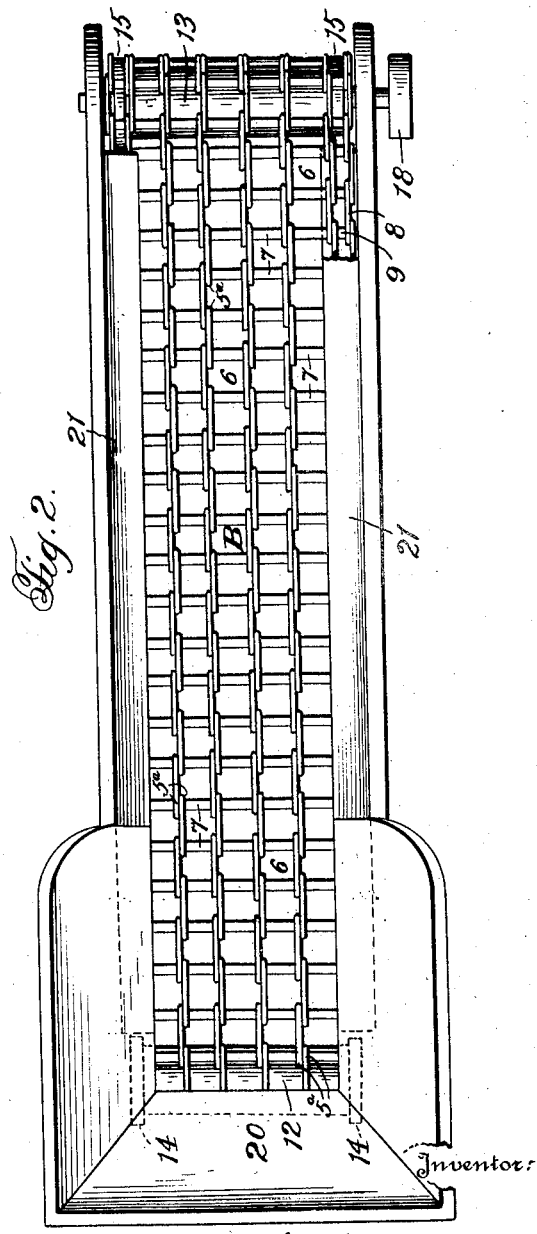

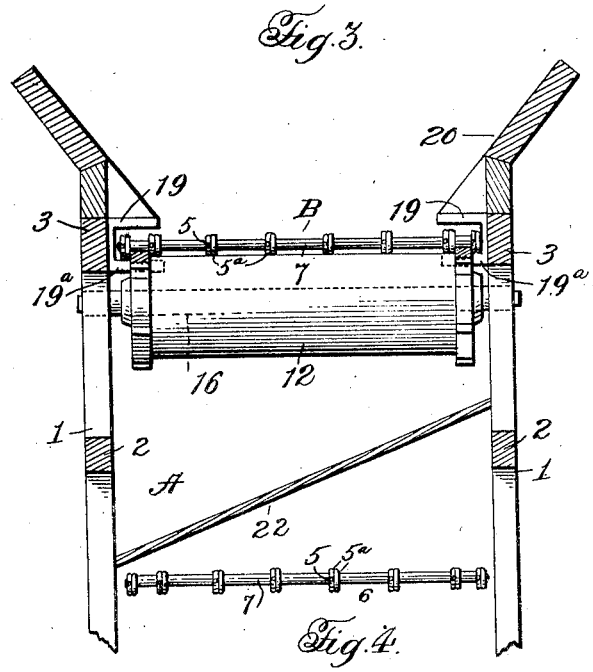
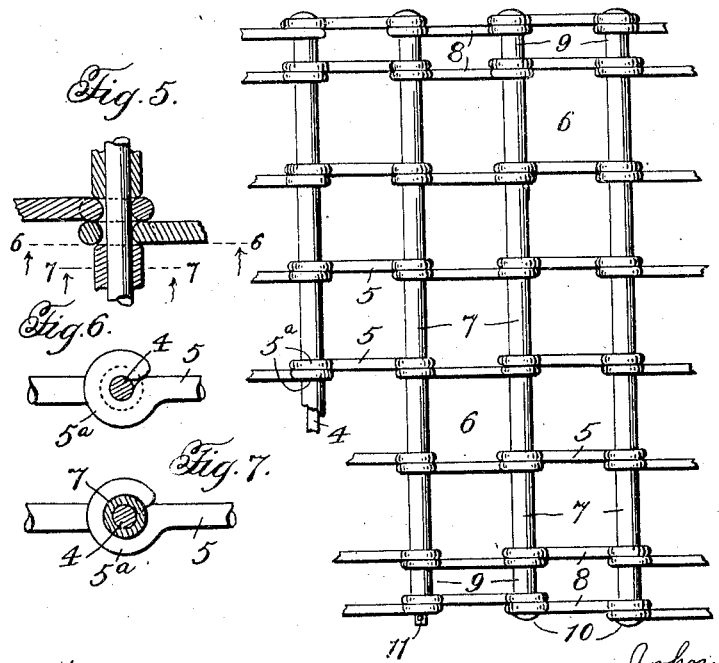

Patented July 19, 1927.

1,636,227

UNITED STATES PATENT OFFICE.

JOHN D. GRABILL, OF WOODSTOCK, VIRGINIA.

SIZING MACHINE FOR FRUITS AND VEGETABLES.

Application filed September 13, 1926. Serial No. 135,164.

This invention relates to sizing machines for fruit and vegetables, apples, oranges, potatoes, onions and the like, to machines for this purpose of the type in which an endless traveling sizing chain is employed, the chain being provided with grading openings for the passage of the smaller size fruit or vegetables.

The object of the invention is to provide an improved machine of the type referred to, to provide an improved construction of sizing chain and supporting and driving means therefor to provide for a more efficient rapid sizing of the material, to prevent clogging of the openings of the sizing chain, and to avoid bruising and crushing of the fruit or vegetables, and the losses incidental thereto.

Particularly important novel characteristics of the invention reside in the special construction of a sizing chain to prevent wedging of the fruit or vegetables in the openings of the chain, and also in the particular chain structure in combination with the particular supporting and driving means employed whereby crushing of the fruit or vegetables is largely avoided, and a simple, efficient construction afforded.

The invention with other objects and advantages thereof, and the particular construction, combination and arrangement of parts comprising the same will be understood from the following detail description, when considered in connection with the accompanying drawings forming part hereof and illustrating one embodiment of the invention.

In the drawings:

Figure 1 is a longitudinal vertical section of a machine constructed in accordance with the present invention.

Fig. 2 is a top plan view.

Fig. 3 is a transverse vertical section.

Fig. 4 is a detail view, on an enlarged scale, of a portion of the sizing chain.

Fig. 5 is a detail view, on an enlarged scale, of a portion of the sizing chain, with parts shown in section.

Fig. 6 is a section on the line 6—6 of Figure 5 looking in the direction of the arrow.

Fig. 7 is a section on the line 7—7 of Figure 5.

While a particular embodiment of the invention is illustrated in the drawings, it will of course be understood that changes and modifications of the particular construction illustrated may be made, and the invention embodied in other forms, as will appeal to those skilled in the art and falling within the scope of the appended claims without departing from the spirit of the invention.

Referring to a detail description of the particular embodiment of the invention illustrated in the drawings, A designates the frame of the machine, which may be of any suitable construction, the same being shown as comprising uprights 1 connected by upper and lower longitudinal bars 2—3.

The sizing chain, designated generally B in Figures 1 and 2 of the drawings, comprises rigid transverse rod members 4 and series of intermediate longitudinal link members 5 pivotally connected therewith, the arrangement being as illustrated so that grading openings 6 of similar size are provided between the series of longitudinal links 5 and the transverse rod members 4. The transverse rod members 4 consist of stout metal rods shown circular in cross section and provided with smooth polished faces. The longitudinal link members 5, which are of metal, and may be formed from heavy wire, have smooth rounded outer faces, being preferably as shown circular in cross section, said members being provided with eyes 5ª at either end thereof to engage the transverse rod members 4. On the transverse rod members 4 between the longitudinal link members 5 are tubular members or sleeves 7. The tubular members or sleeves 7, shown of cylindrical form, are rotatably mounted upon the transverse rod members 4 between the longitudinal link members 5, said sleeve members while serving as spacing means for the longitudinal link members 5 are freely rotatable and function to prevent sticking or wedging of the fruit or vegetables in the grading openings 6 of the chain. At either side of the chain is a set of outer longitudinal link members 8 similiar in construction to the link members 5 and pivotally connected in a similar manner to the transverse rod members 4 at the outer end portions thereof, said outer sets of links with the outermost of the series of link members 5 and the outer end portions of the transverse rod members 4 constituting side sections to engage supporting and driving sprocket wheels. 9 designates spacing sleeves on the transverse rod members 4 between the longitudinal links 8 and the outermost of the series of longitudinal links 5. The transverse rod members 4 are provided at their ends with suitable retaining means, the same preferably, as shown, principally taking the form of integral heads 10, one of the transverse rod members being shown provided with detachable retaining means at one end thereof such as a cotter pin 11 to provide for applying the chain to and its removal from the machine.

The supporting and driving means for the sizing chain comprises rollers 12, 13, having smooth faces, as shown, and pairs of sprocket wheels 14, 15, at the ends of the rollers, said rollers and sprocket wheels being fixedly secured to shafts 16, 17, mounted for rotation in suitable bearings on the frame A. The sprocket wheels 14, 15, project outwardly beyond the faces of the rollers 12, 13, as shown, the arrangement being such that the sizing chain B engages the rollers 12, 13, and the outer side sections of the chain including the outermost of the series of longitudinal links 5, the outer longitudinal links 8, and the end portions of the transverse rod members 4 engaging the sprocket wheels, the end portions of the transverse rod members 4 of the chain engaging sockets 14$^a$, 15$^a$, of the sprocket wheels. 18 designates a driving pulley on the shaft 17.

At either side of the supporting frame A are longitudinally extending slide ways 19 between the pairs of sprocket wheels 14—15 for the said marginal sprocket engaging portions of the active stretch of the chains B, the bottom boards 19$^a$ of said ways constituting tracks upon which the side portions of the chain slide and are supported.

20 designates a hopper at one end of the machine and 21 are side boards to retain the fruit or vegetables on the sizing chain.

As will be understood, in the operation of the machine, the fruit is fed to the hopper 20 upon the traveling sizing chain B, the smaller size apples or the like dropping through the grading opening 6 in the upper stretch of the chain to a receptacle or chute 22 and are delivered at one side of the machine while the larger apples or the like are carried by the chain to the open end of the machine and discharged on to the next size grading chain or into any suitable receptacle (not shown).

It will be noted that the particular construction and arrangement of parts hereinbefore set forth afford a simple and efficient fruit sizing machine. The special construction of sizing chain serves to prevent sticking and wedging of the fruit or vegetables in the grading openings of the chain. The freely rotatable sleeve members on the transverse rod members of the chain facilitate the easy passage of the fruit and vegetables of a predetermined size through the openings of the chain. They also function to permit larger size fruit or vegetables that may extend partly through the openings in the chain, to be easily pushed back without crushing to the upper side of the chain by the smooth roller 13 at the discharge end of the chain. Thus clogging of the chain and crushing of the fruit or vegetables is largely avoided, and a more rapid efficient separation is obtained.

What I claim is:

1. In a fruit and vegetable sizing machine, an endless sizing chain, a pair of supporting rolls for the chain, each roll having a pair of sprocket wheels fixedly secured thereto at the ends thereof, and the roll at the delivery end of the chain having a substantially smooth outer face, said chain comprising rigid transverse rod members, series of intermediate longitudinal link members pivotally connected therewith and spaced to provide grading openings of similar size, and a set of outer longitudinal link members pivotally connected with the outer end portions of the transverse rod members at either end thereof, said outer longitudinal link members being spaced from the outermost of the first mentioned series of longitudinal link members to cooperate therewith and with the end portions of said transverse rod members to constitute side sprocket chain portions to engage the said pairs of sprocket wheels.

2. In a fruit and vegetable sizing machine, an endless sizing chain, a pair of supporting rolls for the chain, each roll having a pair of sprocket wheels fixedly secured thereto at the ends thereof, and the roll at the delivery end of the chain having a substantially smooth outer face, said chain comprising rigid transverse rod members, series of intermediate longitudinal link members pivotally connected therewith and spaced to provide grading openings of similar size, and a set of outer longitudinal link members pivotally connected with the outer end portions of the transverse rod members at either end thereof, said outer longitudinal link members being spaced from the outermost of the first mentioned series of longitudinal link members to cooperate therewith and with the end portions of said transverse rod members to constitute side sprocket chain portions to engage the said pairs of sprocket wheels, and a track at either side of the machine between the pairs of rolls to be engaged by said side sprocket portions and to assist in supporting the active stretch of the sizing chain.

3. In a fruit and vegetable sizing machine, an endless sizing chain, a pair of supporting rolls for the chain, each roll having a pair of sprocket wheels fixedly secured thereto at the ends thereof, and the roll at the delivery end of the chain having an outer face to present a smooth outer surface beneath and throughout the grading openings of the chain in its passage over said roll said chain comprising rigid transverse rod members, series of intermediate longitudinal link members pivotally connected therewith and spaced to provide grading openings of similar size, sleeve members rotatably mounted on the transverse rod members between the longitudinal link members, and a set of outer longitudinal link members pivotally connected with the outer end portions of the transverse rod members at either end thereof, said outer longitudinal link members being spaced from the outermost of the first mentioned series of longitudinal link members to cooperate therewith and with the end portions of said transverse rod members to constitute side sprocket chain portions to engage the said pairs of sprocket wheels.

4. In a fruit and vegetable sizing machine, an endless sizing chain, a pair of supporting rolls for the chain, drive connections for the chain located at either end of the rolls, said chain comprising rigid transverse rod members of circular cross section, series of intermediate longitudinal link members rounded in cross section pivotally connected with the transverse rod members and spaced to provide grading openings of similar size, and cylindrical sleeve members rotatably mounted on the transverse rod members between the longitudinal link members.

5. In a fruit and vegetable sizing machine, an endless sizing chain, a pair of supporting rolls for the chain, drive connections for the chain located at either end of the rolls, said chain comprising rigid transverse rod members of circular cross section, series of intermediate longitudinal link members pivotally connected therewith and spaced to provide grading openings of similar size, said longitudinal link members having rounded outer faces and consisting of rod sections circular in cross section and bent to provide eyes at the ends thereof to pivotally engage said transverse rod members, and cylindrical sleeve members rotatably mounted on the transverse rod members between the longitudinal link members.

In testimony whereof I hereunto affix my signature.

JOHN D. GRABILL.